(12) United States Patent
Bishop et al.

(10) Patent No.: US 8,276,813 B2
(45) Date of Patent: Oct. 2, 2012

(54) SYSTEMS AND METHODS FOR RISK TRIGGERING VALUES

(75) Inventors: Fred Bishop, Glendale, AZ (US); Eric James Eldridge, Scottsdale, AZ (US); William S. Schwarz, Jr., Jefferson, SD (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 13/353,054

(22) Filed: Jan. 18, 2012

(65) Prior Publication Data

US 2012/0123881 A1   May 17, 2012

Related U.S. Application Data

(63) Continuation of application No. 12/164,043, filed on Jun. 28, 2008, now Pat. No. 8,104,675, which is a continuation-in-part of application No. 10/907,511, filed on Apr. 4, 2005, now Pat. No. 7,398,918.

(51) Int. Cl.
   *G06Q 40/00*   (2006.01)
(52) U.S. Cl. ............. 235/379; 235/380; 705/39; 705/44
(58) Field of Classification Search .................. 235/379, 235/380; 705/39, 44
   See application file for complete search history.

(56) References Cited

U.S. PATENT DOCUMENTS

| | | | |
|---|---|---|---|
| 4,734,564 A | 3/1988 | Boston et al. | |
| 5,177,342 A | 1/1993 | Adams | |
| 5,679,940 A | 10/1997 | Templeton et al. | |
| 5,988,497 A | 11/1999 | Wallace | |
| 6,427,912 B1 | 8/2002 | Levasseur | |
| 6,658,393 B1 | 12/2003 | Basch et al. | |
| 6,785,661 B1 | 8/2004 | Mandler et al. | |
| 2001/0005832 A1* | 6/2001 | Cofta | .............................. 705/17 |

OTHER PUBLICATIONS

USPTO; Office Action dated Apr. 13, 2007 in U.S. Appl. No. 10/907,511.
USPTO; Final Office Action dated Sep. 27, 2007 in U.S. Appl. No. 10/907,511.
USPTO; Advisory Action dated Dec. 26, 2007 in U.S. Appl. No. 10/907,511.
USPTO; Notice of Allowance dated Apr. 8, 2008 in U.S. Appl. No. 10/907,511.
USPTO; Office Action dated Apr. 4, 2011 in U.S. Appl. No. 12/164,043.
USPTO; Final Office Action dated Aug. 2, 2011 in U.S. Appl. No. 12/164,043.
USPTO; Notice of Allowance dated Sep. 28, 2011 in U.S. Appl. No. 12/164,043.

* cited by examiner

*Primary Examiner* — Daniel Hess
(74) *Attorney, Agent, or Firm* — Snell & Wilmer L.L.P.

(57) ABSTRACT

Systems and methods for facilitating risk assessment for point of sale transactions utilizing at least one risk triggering value (RTV) is disclosed. An RTV is a condensed version of a set of complex risk data and strategies usually found in central processing sites. After receiving a request for payment authorization, a risk value is calculated for the request. The distributed processing site compares the risk value to the RTV to determine whether to authorize payment. If the risk value is less than or equal to the RTV, the payment is authorized while a risk value greater than the RTV will not be authorized. The central site calculates a new RTV for the account and distributes the new RTV to the distributed processing site.

23 Claims, 2 Drawing Sheets

SYSTEMS AND METHODS FOR RISK TRIGGERING VALUES

CROSS REFERENCE TO RELATED APPLICATIONS

This application is a continuation of, and claims priority to, U.S. Ser. No. 12/164,043 filed Jun. 28, 2008 and entitled "SYSTEMS AND METHODS FOR RISK TRIGGERING VALUES." The '043 application is a continuation-in-part of, and claims priority to, U.S. Pat. No. 7,398,918 issued Jul. 15, 2008 (aka U.S. Ser. No. 10/907,511 filed Apr. 4, 2005) and entitled "SYSTEMS AND METHOD FOR RISK TRIGGERING VALUES." Both of which are hereby incorporated by reference in their entirety.

FIELD OF INVENTION

The invention generally relates to payment authorization for commercial transactions, and more particularly, to assessing an amount of risk related to a request for payment authorization received at a distributed processing site.

BACKGROUND OF THE INVENTION

A merchant often receives a payment instrument (e.g., credit card, pre-paid card, charge card, debit card, smart card, stored-value card, etc.) to facilitate payment for items (e.g., goods, services, information, etc) a consumer wishes to purchase. The merchant may use a point of sale (POS) device to request authorization for the purchase by swiping the payment instrument through the POS device. The POS device then usually communicates to a distributed processing site—which may be local and/or regional—acting as a concentrator and providing value add services. Normally, the authorization request is forwarded from the distributed processing site to a central processing site for authorization processing. The central processing site acts as a "large footprint" because of it physical size, amount of processing power and large storage capability, and may also include complex risk data and strategies, which are not found within distributed processing sites. After a risk assessment for the transaction is processed, the central processing site transmits, via the distributed processing site or directly, the results of the payment authorization to the POS device based upon the perceived risk.

There are occasions, however, where a distributed processing site, and not a central processing site, may authorize payment. Currently, the authorization at distributed processing sites is based upon factors, such as for example, floor limits, negative and positive file lists, and possibly some accumulation of recent transaction instrument usage. These relatively simple factors are adequate for some situations (e.g., payment requests for small amounts, payment requests from merchants within the same zip code as the user's billing address, and the like), but many situations require distributed processing sites to forward the authorization request to a central processing site because of the central processing site's greater ability to assess risk by utilizing more complex factors. Because a central processing site may be connected to multiple distributed processing sites, the central processing site may become too busy and not operate efficiently (i.e., not transmitting an authorization or decline within a relatively short period of time), or may become so busy that it may not completely fail to transmit an indication of authorization or decline. Furthermore, a central processing site may also transmit inaccurate authorizations or declines if it becomes too busy. Thus, systems and methods are needed that allow distributed processing sites to process and transmit payment authorization and declines for transactions requiring more complex risk assessment.

SUMMARY OF THE INVENTION

The invention relates to systems and methods for determining the results of an authorization of payment requests at a distributed processing site. A set of complex risk data and strategies is condensed at a central processing site to establish one or more risk triggering value (RTV). The RTV may be distributed from the central processing site to one or more distributed (local and/or regional) processing sites, wherein the distributed processing site receives a request from a merchant point of sale device for payment authorization. The distributed processing site then calculates a risk value for the request and compares the risk value to the RTV for that type of account, type of consumer, and/or that particular account. If the RTV is greater than or equal to the risk valve, the payment request is authorized. If the RTV is lower than the risk valve, the payment request is declined or forwarded to a central processing site for further processing and/or analysis prior to authorization or denial. In situations where the payment request is authorized, the distributed processing site sends the transaction information (either individually or as a batch) to the central processing site wherein the central processing site processes the information to calculate a new RTV, and distributes the new RTV to the distributed processing sites.

The invention includes a computer-implemented method to facilitate authorization of a payment request at a distributed processing site comprising the steps of: condensing a set of risk data and strategies, wherein the set of risk data and strategies are managed at a central processing site, and the condensed set of risk data and strategies comprise a risk triggering value (RTV); distributing the RTV to at least one distributed processing site; receiving a request for payment authorization from a merchant point of sale device, wherein the request is received at the distributed processing site; and, determining at the distributed processing site whether to transmit a payment authorization to the merchant POS device, wherein the payment authorization is based in part upon the RTV, and wherein the step of determining whether to transmit payment authorization comprises the steps of: calculating a risk value for the request, comparing the risk value to the RTV, and at least one of transmitting a payment authorization when the risk value is at least one of less than and equal to the RTV, and transmitting a decline message when the risk value is greater than the RTV.

DETAILED DESCRIPTION OF THE INVENTION

The detailed description of exemplary embodiments of the invention herein makes reference to the accompanying figures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional embodiments of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
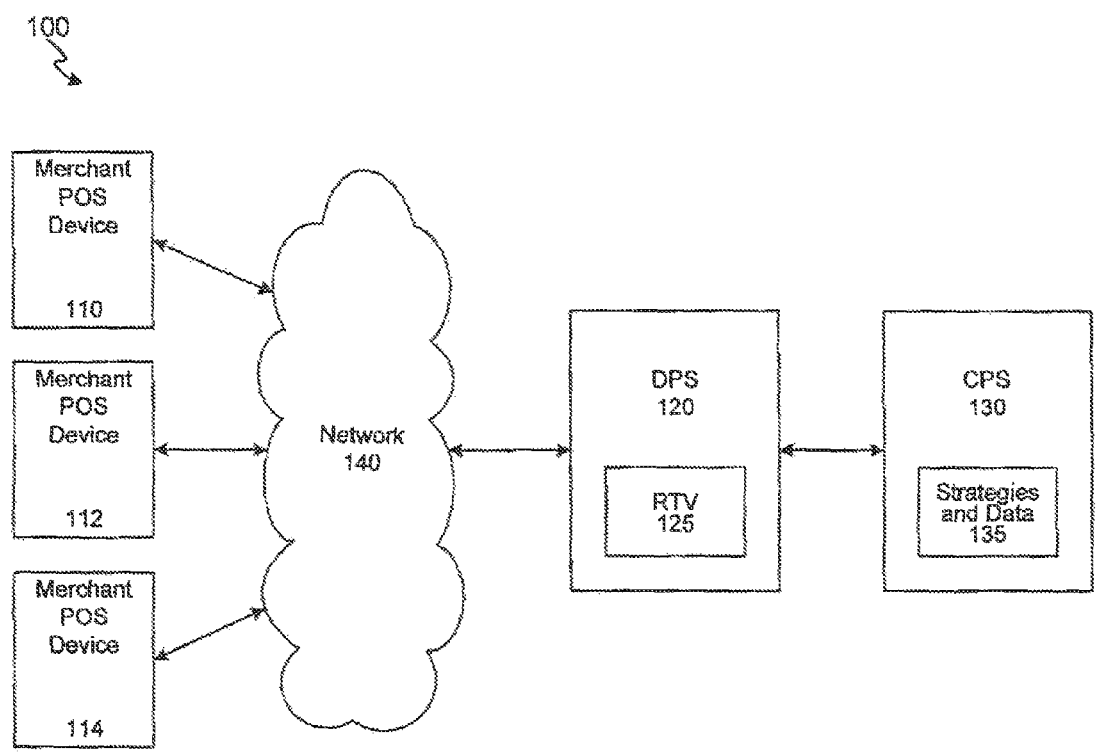
FIG. 1 is a block diagram of a system to facilitate payment authorization at one or more distributed processing sites in accordance with an embodiment of the present invention; and, FIG. 2 is a flow diagram of a method to facilitate payment authorization at one or more distributed processing sites in accordance with an embodiment of the present invention.

Turning now to the figures, FIG. 1 is a block diagram illustrating an exemplary embodiment of a system 100 utilizing at least one merchant point of sale (POS) device 110 to facilitate authorizing a payment request at one or more distributed processing sites (DPS) 120. In one embodiment, system 100 facilitates the secure transmission of requests for payment authorization and approval of such requests between POS device 110 and DPS 120.

The invention contemplates that POS device 110 is any software and/or hardware suitably configured to facilitate a purchase. In one embodiment, POS device 110 is configured to receive payment data and/or transaction data, POS device 110, in another embodiment, is configured to transmit a request for payment authorization, which may include payment data and transaction data, to at least one DPS 120. In yet another embodiment, POS device 110 is a consumer computing unit in the form of a personal computer, however, other types of computing units such as, for example, laptops, notebooks, hand held computers, set-top boxes, cellular telephones, touch-tone telephones and the like may be used. Moreover, POS device 110 may be a merchant computing unit implemented in the form of a computer-server, although other implementations are contemplated. Furthermore, reference to a single POS device 110, DPS 120, central processing site (CPS) 130 (discussed below) or any other component described herein may also include a plurality of the respective device such as, for example, more than one POS device 110 (e.g., POS devices 112 and 114), DPS 120, CPS 130 or other component, respectively.

As used herein, the term "transmit" includes, for example, sending electronic data from one system component to another over a network connection. Additionally, as used herein, the term "data" includes, for example, encompassing information such as commands, queries, files, data for storage, and the like in digital or any other form. The term "transaction data" includes, for example, the amount of purchase, at least one payment instrument account number, at least one item identifier for each item being purchased, loyalty information, demographic information and/or any other data helpful in processing a transaction. A payment instrument may include, for example, a credit card, a debit card, a charge card, a RFID, a chip based card, a stored value card and/or any other instrument capable of being presented for payment of an item. An "account" or "account number", as used herein, may include, for example, any device, code, number, letter, symbol, digital certificate, smart chip, digital signal, analog signal, biometric or other identifier/indicia suitably configured to allow the consumer to access, interact with or communicate with the system (e.g., one or more of an authorization/ access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, system 100 may include any device having a transponder configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include, for example, watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like.

As used herein, an "item" includes, for example, one or more data, information, good and/or service capable of being exchanged between entities. In addition, an "item identifier" may include, for example, a universal product code (UPC), a stockkeeping unit (SKU), a serial number, a reference number, a category number, a service type indicator, a description and/or other any other information capable of identifying an item.

As discussed above, system 100 also includes DPS 120, wherein DPS 120 includes any hardware and/or software suitably configured to communicate and/or process transaction information. In an exemplary embodiment, DPS 120 (or any other computer component discussed herein) includes a processor for processing digital data, a memory coupled to the processor for storing digital data, an input digitizer coupled to the processor for inputting digital data, an application program stored in the memory and accessible by the processor for directing processing of digital data by the processor, a display device coupled to the processor and memory for displaying information derived from digital data processed by the processor, and a plurality of databases. Though shown in the figures as a main frame computer, in other embodiments, DPS 120 is implemented as a mini-computer, a PC server, a network of computers located in the same or different geographic locations, or the like.

In one exemplary embodiment, DPS 120 is configured to receive and process a request for payment authorization from POS device 110. As such, an electronic commerce system may be implemented at DPS 120 and POS device 110. In one embodiment of the invention, the electronic commerce system is implemented as computer software modules loaded onto POS device 110 and DPS 120 such that DPS 120 does not require any additional software to participate in any online commerce transactions supported by an electronic commerce system. Furthermore, DPS 120 is also configured in one embodiment to transmit payment authorization and/or declines to POS device 110 based upon a comparison of the requested payment amount to a risk-triggering value (RTV) 125 (discussed below) stored/managed within DPS 120. In one embodiment of the invention, each consumer may have an RTV 125 stored/managed within DPS 120 and/or DPS 120 may store/manage at least one RTV 125 applicable to some or all consumers.

In another embodiment, DPS 120 is configured to communicate with CPS 130, which may include transmitting transaction data to CPS 130. In one exemplary embodiment of the invention, DPS 120 is configured to receive and store at least one RTV 125 received from CPS 130, RTV 125, in one exemplary embodiment, is a condensed version of a set of complex risk data and strategies 135. In one embodiment of the invention, RTV 125 (and new RTV 125', discussed below) is an alphanumeric value (e.g., a dollar value, an integer value, a fraction, a decimal value, and the like). In another embodiment, RTV 125 also includes condensed data and strategies comprised of one or more transaction variables and/or one or more environmental variables. Transaction variables include, for example, whether the transaction instrument is present at the time of purchase, transaction amount, account type (charge, credit, debit, pre-paid, etc.), account status (e.g., gold card, preferred member, etc.), type of item being purchased, consumer location, merchant classification, merchant location, token type, history of payment, consumer's ability to pay, and any other variable that may affect the amount of risk involved in authorizing a transaction. Similarly, environmental variables include, for example, date of transaction; time of transaction; seasonal holidays; special event; and health of domain, nodes, and/or data quality (e.g., all of the fields are filled and/or are accurate).

In one embodiment, DPS 120 is coupled to POS device 110 (and POS devices 112 and 114) via network 140. Network 140 includes, for example, any electronic communications means which incorporates hardware and/or software components of such. Communication among the devices in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference. Moreover, system 100 contemplates the use, sale or distribution of an item or information over any network having similar functionality described herein.

System 100, in one exemplary embodiment, includes CPS 130 coupled to DPS 120. CPS 130 may be any hardware and/or software suitably configured to facilitate authorizing and/or declining a payment request for commercial transactions involving financial accounts. In one exemplary embodiment, CPS 130 stores and/or manages at least one set of complex risk data and strategies 135. CPS 130, in another exemplary embodiment, is configured to condense a set of complex risk data and strategies 135 to calculate RTV 125, and transmit RTV 125 to at least one DPS 120. In addition, in an exemplary embodiment, CPS 130 is configured to periodically receive transaction data from DPS 120 and process the data to calculate a new RTV 125', which is then transmitted to DPS 120.

In one embodiment of the invention, a set of complex risk data and strategies 135 may include information related to individual credit, charge, pre-paid, and/or debit accounts. For example, CPS 130 may include information related to the consumer's payment history, ability to pay, and/or any other information helpful in determining the consumer's credit worthiness. In another embodiment, set of complex risk data and strategies 135 may include information related to the residence of the consumer using, for example, the consumer's zip code, billing/street address, municipality information, and/or any other information related to the consumer's residence. In yet another embodiment of the invention, set of complex risk data and strategies 135 may include information related to the type of merchant which is requesting payment. For example, CPS 130 may contain information indicating that the requesting merchant is a florist, a gas station, a grocery store, an on-line seller, and the like. Furthermore, CPS 130 may contain information related to the location of the merchant similar to the information that may be contained for the consumer.

In one exemplary embodiment, a set of complex data and strategies 135 includes positive and negative limits based upon the logistics of the transaction. For example, set of complex data and strategies 135 may include a positive limit indicating that gold card members (or any other status) are automatically approved for certain amounts (e.g., $500.00) at certain merchants (e.g., Barnes & Noble) or websites (e.g., eBay.com) As such, the invention contemplates that there are numerous positive limits available for storage/management in CPS 130 based upon a transaction and/or environmental variable discussed above, or any other appropriate positive limit. Similarly, CPS 130 may include, for example, a negative limit indicating that amounts over a certain amount (e.g., $100.00) requested by certain merchant types (e.g., a gas station) are automatically declined since the potential for fraud is high. Furthermore, the negative limit may also decline amounts over a certain amount (e.g., $200.00) at locations more than specified distance (e.g., 100 miles) from the consumer's residence/billing address. As such, the invention contemplates that there are numerous negative limits available for storage/management in CPS 130 based upon one or more transaction and/or environmental variable discussed above, or any other appropriate negative limit.

In one embodiment of the invention, DPS 120 and CPS 130 are owned and/or operated by the same entity. In another embodiment, DPS 120 and CPS 130 may be owned and/or operated by different entities. As such, the entity owning and/or operating DPS 120 may use the risk assessing resources and/or knowledge of the entity owning and/or operating CPS 130. In one exemplary embodiment, the entity owning and/or operating CPS 130 may charge a fee for providing RTV 125 to DPS 120, and any subsequent new RTVs 125'.

In one embodiment of the invention, system 100 is configured such that each device (e.g., POS device 110, DPS 120, and/or CPS 130) is interconnected via a second network (not shown), referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® or Veriphone® networks.

Figure 2:
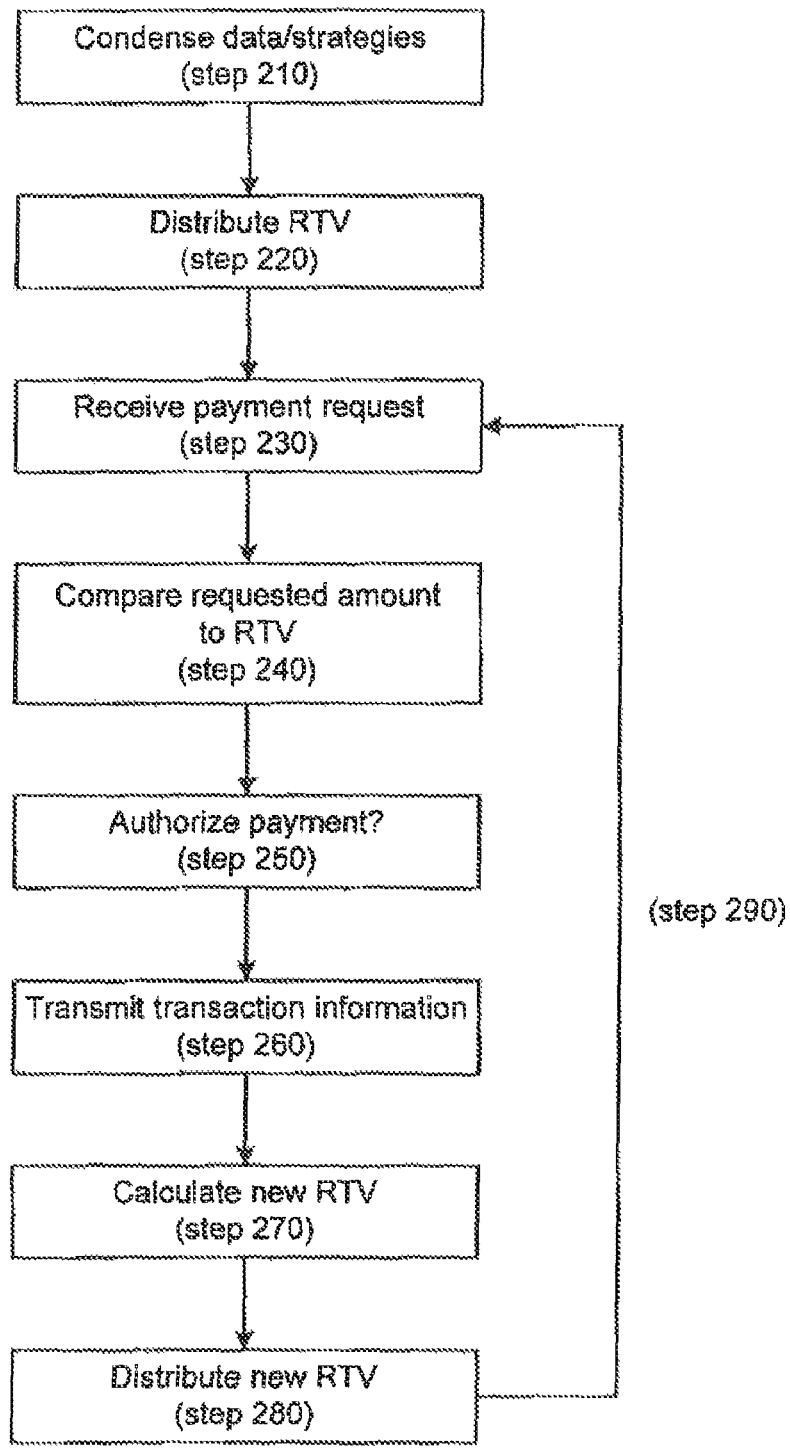

FIG. 2 is a flow diagram of one exemplary embodiment of a method 200 to facilitate payment authorization at one or more DPS (e.g., DPS 120), in one embodiment, method 200 initiates by a CPS (e.g., CPS 130) condensing a set of complex risk data and strategies (e.g., set of complex risk data and strategies 135) to calculate an RTV (e.g., RTV 125) (step 210). In one embodiment, RTV 125 is calculated by condensing a large set of historical transactions (e.g., purchases, cash advances, payments, disputes, and the like) available to system 100. These transactions may span the entire life of the account relationship and may even span multiple account relationships. In conjunction with the current payment status, current billed and unbilled transactions, demographic information, financial information about the client, external credit information, and external scoring information, a set of calculations may condense this large amount of data into one or more trigger points. The trigger point(s), in one embodiment, calculate the point(s) at which the transaction will likely be profitable to the account issuer by assigning a value to each of the above-listed strategy attributes (e.g., long standing customer=5.0, customer has above average income=7.0, customer has high debt to income ratio=−3.5, etc.) and adding the trigger points to form RTV 125. Depending on the type of RTV 125 being established, a profitability trigger (i.e., RTV 125) may additionally be multiplied by a perceived risk factor as a way to further ensure the transaction is profitable to the account issuer. For example, a high-valued account (e.g., an account with a long history of timely payments) may be determined to be half as risky as the average account, and as such, RTV 125 may be doubled for the high-valued account. Likewise, a low-valued account (e.g., an account in default) may be determined to be ten times more risky than the average account, and as such, RTV 125 may be reduced by 90%.

After RTV 125 is calculated, in one exemplary embodiment, CPS 130 distributes RTV 125 to at least one DPS 120 for DPS 120 to store and/or manage (step 220). At some point, DPS 120 will receive a request for payment authorization from one or more POS devices (e.g., POS devices 110, 112, and/or 114) associated with DPS 120 (step 230). In one exemplary embodiment, DPS 120 compares the requested amount to RTV 125 (step 240). In one embodiment of the invention (e.g., when RTV 125 is a dollar value), DPS 120 compares the requested dollar amount (i.e. a risk value) to the RTV 125 dollar amount. In another embodiment, DPS 120 may process transaction information (e.g., transaction and/or environmental variables, discussed above) included in the request for payment authorization, calculate a risk value for the transaction, and compare the risk value to RTV 125. In yet another embodiment of the invention, the risk value is calculated by assigning an individual risk value to each transaction and/or environmental variable, and summing the individual value(s) for comparison to RTV 125. In still another embodiment, each transaction and/or environmental variable may include an appropriate multiplier to further assess the risk for that particular request. For example, if the request is received from a merchant within a short distance from the consumer's residence, a negative multiplier may be included within the calculation of the risk value to indicate a lesser likelihood of fraudulent activity. Likewise, a request from a merchant located a large distance from the consumer's residence may include a positive multiplier since the risk of fraudulent use of the transaction instrument is higher.

In an exemplary embodiment, if the risk value is less than or equal to RTV 125, DPS 120 transmits payment authorization to POS device 110 (step 250). If the risk value is greater than RTV 125, DPS 120 declines the payment request (step 250), and, in one embodiment, transmits a decline message. DPS 120, in one embodiment (and instead of sending a decline message if RTV 125 is less than the risk value), forwards the payment request to CPS 130 for more in-depth risk assessment and/or authorization procedures similar to current methods known in the relevant art(s).

The following example illustrates one example of how a risk value may be calculated by DPS 120, compared to RTV 125, and payment authorization/decline is transmitted. The example is but one example and the nature of RTV 125 and the information contained in various payment requests allows for numerous possibilities, all of which are contemplated by the invention. RTV 125 may include, for example, a 1.5 risk multiplier for request amounts greater than $500.00, an automatic −100 risk value for requests from merchants within 20 miles of the consumer's residence, an automatic +200 risk value for a request from a merchant farther than 20 miles from the consumer's residence (or on-line, or "card not present" transactions), a 5.0 risk multiplier for requests from a gas station, and a 4.0 risk multiplier for requests from an electronics merchant. If RTV 125 is 499, DPS 120 will decline a $60.00 request from a gas station located 25 miles from the consumer's residence because (5.0*60)+200=500, or may forward the request to CPS 130 for further risk assessment and authorization. In another example, if RTV 125 is 1500, DPS 120 will authorize payment for a $400.00 request from an electronics merchant located 19 miles from the consumer's residence because (4.0*400)−100=1500.

If RTV 125 includes a positive and/or negative limit, DPS 120 will authorize or decline a payment request in a manner similar to the above example. For example, if a negative limit (i.e., a risk value) automatically declines requests for amounts greater than $50.00 from a gas station, DPS 120 will decline any request from a gas station for $50.01 or greater, regardless of the location of the gas station. Likewise, if a positive limit (i.e., a risk value) of $500.00 is in place for all consumers from, for example, Amazon.com, DPS 120 will automatically authorize payment for amounts of $500.00 or less. Furthermore, if, for example, a consumer wishes to make a purchase from Amazon.com for an amount greater than $500.00 (e.g., $600.00), DPS 120 may perform a calculation (either $600.00*1.5=900 or $500.00+[$100.00*1.5]=650) similar to the example above to determine the risk value for the transaction, and compare such value to the current RTV 125 in place.

After transmitting payment authorization, in an exemplary embodiment, DPS 120 transmits the transaction information to CPS 130 (step 260). Upon receipt of the transaction information, CPS 130, in an embodiment, utilizes the transaction information to calculate a new RTV 125' (step 270). New RTV 125' may be the same as RTV 125 or may be a different value (which may include new risk data and/or strategies; and/or exclude some risk data and/or strategies). New RTV 125', in one exemplary embodiment, is then distributed to at least one DPS 120 (step 280). The invention contemplates that steps 230 through 280 may then be repeated numerous times as requests for payment authorizations are received and authorized (step 290).

In another embodiment, all or any portion of the functionality of DPS 120 and/or CPS 130 (as discussed herein) resides at a merchant site such as, for example, within a server or POS device. For the sake of explanation, this embodiment will be described as a merchant located DPS. In such embodiments where certain additional functions are located at the merchant, DPS 120 and/or CPS 130 may (or may not) still exist to perform some or all of their functions.

For example, a merchant located DPS may receive RTV 125 for any number of consumers from DPS 120 at regular intervals, or when an RTV 125 is updated. Practitioners will appreciate that a merchant located DPS may retain an entire database of RTVs as provided by CPS 130 or a subset thereof. In one embodiment, a merchant may obtain a RTV 125 when a customer first uses a transaction instrument (e.g., credit card, debit card, check) to facilitate a purchase with a particular merchant and subsequently store the RTV within a local database. For example, when a first time customer of a sporting goods store uses his credit card to purchase a tennis racket, a merchant located DPS searches a local database for an RTV corresponding to the credit card. Because the customer has not previously purchased from the sporting goods store, a corresponding RTV will not be located. As a result, the merchant located DPS sends a purchase authorization request to a primary DPS 120. Along with an authorization signal, the primary DPS 120 sends an RTV corresponding to the customer's credit card. The merchant located DPS stores the RTV, thus any subsequent purchases from the customer may be authorized by the merchant located DPS.

A combination of the various disclosed embodiments may be employed to enable merchants to access RTVs for purchases when, for example, DPS 120 is offline. Accordingly, a merchant may process purchase transactions by transmitting an authorization request to DPS 120 under normal circumstances, while transmitting authorization requests to the merchant located DPS when the DPS 120 is not available due to technical problems or for any other reason. DPS 120 may also employ velocity checking to determine when the volume of authorization requests reaches a predetermined threshold. When the volume of authorization requests reaches a predetermined threshold, DPS 120 triggers a flag which informs all, or a subset of, merchant POS systems that authorization requests should be processed by the merchant located DPS. When the flag is lifted, then the merchant located DPS may transmit an update of RTVs to DPS 120 to synchronize with RTV 125.

The merchant located DPS transmits post authorization notifications to card issuer backend systems such that the authorizations completed at the merchant located DPS may be processed in order to properly settle the transactions. When the merchant located DPS authorizes a number of transactions, for example, the merchant located DPS periodically uploads the post authorization notifications. The uploads may occur at any interval such as for example, hourly, daily, weekly, and the like.

In another embodiment, a merchant located DPS employs velocity checking to determine when the volume of authorization requests reaches a predetermined threshold. When the volume of authorization requests reaches a predetermined threshold, the merchant located DPS triggers a flag which indicates that all, or a subset of, merchant POS authorization requests should be processed by DPS 120 other merchant located DPSs.

In one embodiment, a local calculation of an RTV may be uploaded to DPS 120 at any time (e.g., following a sale transaction). In another embodiment, the local calculations may be stored at the merchant located DPS and uploaded to DPS 120 at reoccurring intervals or upon reaching a defined number of transactions in batch mode.

In another embodiment, DPS 120 provides a merchant located DPS with RTVs based on geographic location or any other parameter. For example, a merchant located in San Francisco may be provided with RTVs for transaction instruments corresponding to consumers residing in San Francisco and surrounding areas. In yet another embodiment, a merchant may be provided RTVs based on one or more demographics. For example, a high end jewelry store may receive RTVs for consumers earning above $200,000. In another example, a merchant catering to women may receive RTVs corresponding to female credit card members.

Practitioners will appreciate that DPS 120 and CPS 130 may reside as a single integrated system. Moreover, the functionality of CPS 130 may reside at the merchant location alone or with the merchant located DPS. For example, strategies and data 135 may be downloaded to a merchant POS device at predefined intervals or whenever changes are made to strategies and data 135.

Various databases used herein may include, for example, client data; merchant data; financial institution data; and/or like data useful in the operation of system 100. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may also include any suitable personal computer, network computer, workstation, minicomputer, mainframe or the like. A user computer may be in a home or business environment with access to a network. In an exemplary embodiment, access is through a network or the Internet through a commercially available web-browser software package.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment of the present invention, any suitable data storage technique may be utilized to store data without a standard format. Data sets may be stored using any suitable technique, including, for example, storing consumer files using an ISO/IEC 7816-4 file structure; implementing a domain whereby a dedicated file is selected that exposes one or more elementary files containing one or more data sets; using data sets stored in consumer files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial payment instrument or external to but affiliated with the financial payment instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial payment instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial payment instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain consumers, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the payment instrument user at the stand alone device, the appropriate option for the action to be taken. The present invention may contemplate a data storage arrangement wherein the header or trailer, or header or trailer history, of the data is stored on the payment instrument in relation to the appropriate data.

One skilled in the art will also appreciate that, for security reasons, any databases, systems, devices, servers or other devices of system 100 may consist of any combination thereof at a single location or at multiple locations, wherein each database or system includes any of various suitable security features, such as firewalls, access codes, encryption, decryption, compression, decompression, and/or the like.

System 100 may be described herein in terms of functional block components and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, system 100 may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, system 100 may be embodied as a customization of an existing system, an add-on product, upgraded software, a standalone system, a distributed system, a method, a data processing system, a device for data processing, and/or a computer program product. Accordingly, system 100 may take the form of an entirely software embodiment, an entirely hardware embodiment, or an embodiment combining embodiments of both software and hardware. Furthermore, system 100 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various embodiments of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A method comprising:
providing, by a merchant located distributed processing site for processing a transaction request, a payment authorization in response to said transaction request and based upon a risk triggering value ("RTV"), wherein said RTV is based upon historical transaction data associated with a transaction account; and
transmitting, by said merchant located distributed processing site and in response to said providing, current transaction data associated with said transaction request, wherein an updated RTV is calculated based upon said RTV and said current transaction data.

2. The method of claim 1, wherein said merchant located distributed processing site is a local distributed processing site, and wherein said local distributed processing site receives said RTV from a regional distributed processing site.

3. The method of claim 1, further comprising receiving said RTV at said merchant located distributed processing site.

4. The method of claim 1, further comprising receiving said RTV at said merchant located distributed processing site from at least one of a regional distributed processing site and a centralized processing site.

5. The method of claim 1, further comprising synchronizing said updated RTV by at least one of said merchant located distributed processing site and a merchant POS device.

6. The method of claim 1, further comprising storing, by said merchant located distributed processing site, transaction information resulting from said transaction request, wherein said transaction information includes at least one of: an identifier of said transaction account, a transaction amount, an authorization message, and a decline message.

7. The method of claim 1, wherein said historical transaction data includes at least one of: purchases, cash advances, payments, and disputes relating to said transaction account.

8. The method of claim 1, wherein said providing further comprises issuing said payment authorization based upon a comparison between said RTV and a risk value.

9. The method of claim 1, wherein a risk value for said transaction request is calculated.

10. The method of claim 1, further comprising calculating, by said merchant located distributed processing site, a risk value for said transaction request.

11. The method of claim 1, wherein a risk value for said transaction request is calculated, and wherein said risk value is based in part upon at least one of: transaction profitability, customer profitability, account profitability, an outcome, a transaction variable and an environmental variable.

12. The method of claim 1, further comprising:
calculating, by said merchant located distributed processing site, a risk value for said transaction request;
comparing, by said merchant located distributed processing site, said risk value to said RTV; and
transmitting, by said merchant located distributed processing site, a payment authorization in response to said risk value being at least one of: less than and equal to said RTV.

13. The method of claim 12, further comprising forwarding, by said merchant located distributed processing site, a risk strategy outcome to a central authorization system.

14. The method of claim 1, wherein providing said payment authorization is based upon at least one of positive limits, negative limits, a transaction variable and an environmental variable.

15. The method of claim 1, further comprising receiving said updated RTV and calculating a new RTV for said transaction request, wherein said new RTV is based in part upon said transaction request and said updated RTV.

16. The method of claim 1, wherein said payment authorization is processed by a merchant Point of Sale (POS) device, in response to at least one of said merchant located distributed processing site and a centralized processing site not being sufficiently available.

17. The method of claim 1, further comprising adjusting a fee for said transaction request based upon at least one of said RTV and a risk value.

18. The method of claim 1, further comprising compiling, by said merchant located distributed processing site, a set of risk data and strategies based on at least one of a transactional variable and an environmental variable.

19. The method of claim 1, further comprising receiving said RTV at said merchant located distributed processing site, wherein said RTV was established by condensing a set of risk data and strategies, wherein said set of risk data and strategies are managed at a central processing site, and said condensed set of risk data and strategies comprise said RTV.

20. The method of claim 1, further comprising receiving, by said merchant located distributed processing site, said updated RTV, wherein said updated RTV is received based on at least one of: predetermined number of transactions, predetermined interval, and predetermined time.

21. The method of claim 1, wherein said RTV is calculated by at least one of: said merchant Point of Sale (POS) device, said merchant located distributed processing site, a central processing site and a central authorization system.

22. An article of manufacture including a non-transitory, tangible computer readable storage medium having instructions stored thereon that, in response to execution by a merchant located distributed processing site for processing a transaction request, cause said merchant located distributed processing site to be capable of performing operations comprising:
providing, by said merchant located distributed processing site, a payment authorization in response to said transaction request and based upon a risk, triggering value ("RTV"), wherein said RTV is based upon historical transaction data associated with a transaction account; and
transmitting, by said merchant located distributed processing site and in response to said providing, current transaction data associated with said transaction request, wherein an updated RTV is calculated based upon said RTV and said current transaction data.

23. A system comprising:
a processor associated with a merchant located distributed processing site for processing a transaction request,
a tangible, non-transitory memory configured to communicate with said processor, said tangible, non-transitory memory having instructions stored thereon that, in response to execution by said processor, cause said processor to be capable of performing operations comprising:
providing, by said processor, a payment authorization in response to said transaction request and based upon a risk triggering value ("RTV"), wherein said RTV is based upon historical transaction data associated with a transaction account; and
transmitting, by said processor and in response to said providing, current transaction data associated with said transaction request, wherein an updated RTV is calculated based upon said RTV and said current transaction data.

* * * * *